(12) United States Patent
Moliton et al.

(10) Patent No.: US 7,857,444 B2
(45) Date of Patent: Dec. 28, 2010

(54) OPHTHALMIC LENS INCORPORATING AN OPTICAL INSERT FOR PROJECTING INFORMATION

(75) Inventors: Renaud Moliton, Charenton-le-Pont (FR); Cécile Bonafos, legal representative, Paris (FR); Benjamin Rousseau, Charenton-le-Pont (FR)

(73) Assignee: Essilor Int'l (Compagnie Generale d'Optique), Charenton-le-Pont (FR)

( * ) Notice: Subject to any disclaimer, the term of this patent is extended or adjusted under 35 U.S.C. 154(b) by 46 days.

(21) Appl. No.: 12/308,132

(22) PCT Filed: Jul. 4, 2007

(86) PCT No.: PCT/FR2007/051590
§ 371 (c)(1),
(2), (4) Date: Dec. 5, 2008

(87) PCT Pub. No.: WO2008/003903
PCT Pub. Date: Jan. 10, 2008

(65) Prior Publication Data
US 2010/0045927 A1    Feb. 25, 2010

(30) Foreign Application Priority Data
Jul. 6, 2006    (FR) .................... 06 52840

(51) Int. Cl.
*G02C 1/00*    (2006.01)

(52) U.S. Cl. .................. 351/158; 351/159; 359/630
(58) Field of Classification Search ........... 351/41, 351/158, 159; 359/629, 630
See application file for complete search history.

(56) References Cited

U.S. PATENT DOCUMENTS

| 6,879,443 B2 * | 4/2005 | Spitzer et al. ............. 359/630 |
| 2003/0165017 A1 | 9/2003 | Amitai ...................... 359/636 |
| 2008/0158684 A1 | 7/2008 | Moliton et al. ............. 359/630 |
| 2008/0273246 A1 | 11/2008 | Moliton et al. ............. 359/633 |

FOREIGN PATENT DOCUMENTS

| FR | 2698454 | 5/1994 |
| FR | 2872589 | 1/2006 |
| GB | 2123974 | 2/1984 |
| GB | 2134759 | 8/1984 |

* cited by examiner

Primary Examiner—Huy K Mai
(74) Attorney, Agent, or Firm—Sofer & Haroun, LLP

(57) ABSTRACT

The invention provides an eyesight correcting lens having a front face and a rear face, and into which light beams emitted by a light beam generator system are introduced via an inlet surface and directed towards the eye of an ametropic wearer of said lens to enable information content to be viewed, an optical insert being included in the lens, said lens being arranged so as to enable the wearer of said lens to provide an accommodation effort that is less than or equal to 2D when viewing the information content.

18 Claims, 3 Drawing Sheets

OPHTHALMIC LENS INCORPORATING AN OPTICAL INSERT FOR PROJECTING INFORMATION

RELATED APPLICATIONS

This application is a National Phase Application of PCT Patent Application no. PCT/FR2007/051590, filed on Jul. 4, 2007, which claims priority to French Patent Application No. 06-52840, filed on Jul. 6, 2006, the entirety of which are incorporated by

FIELD OF THE INVENTION

The present invention relates to an ophthalmic lens, more particularly to a single-vision ophthalmic lens, having incorporated therein an optical insert, said optical insert serving to enable information of the image or multimedia type to be projected.

The invention applies typically, but not exclusively, to optical systems that can be mounted in an eyeglass frame.

BACKGROUND

Document FR-2 873 212 proposes a method of fabricating a vision-correcting lens that fully incorporates a transparent optical insert.

The vision-correcting lens has a front face and a rear face and light beams emitted by an optical element of a light beam generator system are introduced into said lens via an inlet surface thereof and they directed towards the eye of the wearer in order to enable an information image to be viewed.

The light beams are reflected between the two reflection faces of the transparent optical insert, the insert being constituted by a light guide.

The information image is corrected by adjusting the focusing of the image on the light beam generator system, when the configuration of the optical insert makes that possible.

Since the information light path does not pass through the front face of the eyeglass lens, the optical correction available on the information image path is equal to the power of the rear face only. The optical correction available on the path of the information image therefore does not correspond to the vision correction that has been prescribed for the wearer. The correction deficit is compensated by changing the focusing of the generator system.

Document FR-2 872 586 describes in greater detail that type of ophthalmic display that enables the information image to be adjusted by focusing the optical beam generator system.

The ophthalmic display is fitted with a device for adjusting focusing by adjusting the length of the light beams.

The light beams are emitted from a miniature screen placed in a housing that is situated behind the rear face of the lens.

The adjustment device comprises a stationary plate supporting a miniature lens. The stationary plate is also connected to the miniature screen via an adjustable moving connection.

However, the housing in that type of device that includes an adjustment system is bulky and gets in the way of the wearer of the ophthalmic display.

OBJECTS AND SUMMARY

In addition, the functional mechanical structure of that type of device is fragile, in particular the moving connection that enables the miniature screen to be moved.

That type of adjustment is fiddly and awkward when the mechanical system is miniaturized for reasons of compactness.

Other optical devices such as optical systems for superposing an information image on the image of the surroundings, e.g. as described in document FR-2 698 454, are also well known to the person skilled in the art. Nevertheless, they do not enable the eyesight of an ametropic wearer to be corrected.

The invention seeks to solve the problems of the prior art by proposing an ophthalmic lens incorporating an optical insert for viewing an information image, said lens presenting ophthalmic correction that is optimized both for the information image and for the image of the surroundings, as seen by an ametropic wearer.

To this end, the invention provides an eyesight correcting lens having a front face and a rear face, and into which light beams emitted by a light beam generator system are introduced via an inlet surface and directed towards the eye of an ametropic wearer of said lens to enable information content to be viewed, an optical insert being included in the lens, said lens being arranged so as to enable the wearer of said lens to provide an accommodation effort that is less than or equal to 2D when viewing the information content.

In the present invention, the abbreviation D stands for "diopter".

By means of the invention, the essential functions of correcting both information viewing and ordinary eyesight are provided by a particular arrangement of the lens that enables the ametropic wearer to see clearly and comfortably in both situations.

Surprisingly, the Applicant has discovered that the fact of requiring an accommodation effort that is less than or equal to 2D enables any ametropic individual younger than about 50, and preferably younger than about 45, to view the information image without being fatigued.

The ametropic wearer thus has optimized correction matching both for viewing the surroundings and for viewing the information.

In addition, the present invention can be used with any type of light beam generator system, in particular light beam generator systems that do not provide for adjusting focusing by adjusting the viewing distance of the information image.

Finally, the present invention can also be used with any type of optical insert, and in particular with optical inserts of a shape that enables them to be used with light beam generator systems that present specific focusing matching said shape.

Preferably, the vision correction lens enables both the information image and the surroundings to be viewed simultaneously, the surroundings being superposed on the information image.

In an embodiment, said lens for a short-sighted wearer is arranged in such a manner that the power of the front face of the lens lies in the range 0D to +3D, the additional power needed for the lens for correcting the vision of said wearer being provided by the rear face of the lens.

In a particular example, the power of the front face of the lens is equal to +1D.

In another embodiment, said lens for a long-sighted wearer is arranged in such a manner that the power of the rear face of the lens lies in the range −1.25D to 0D, the additional power needed by the lens for correcting the vision of said wearer being provided by the front face of the lens.

In a particular example, the power of the rear face of the lens is equal to −0.25D.

In another embodiment, the lens includes at least one correction element situated between the optical insert and the eye of the wearer.

In a particular example, the correction element comprises an element that increases the depth of field.

Preferably, the lens comprises:
a first correction element situated between the optical insert and the eye of the wearer; and
a second correction element situated between the optical insert and the information content;

the power of said second correction element being equal to the opposite of the power of said first correction element.

In a variant, at least one of its correction elements comprises a patch.

In an aspect of the invention, at least one patch is of the diffractive type.

In another aspect of the invention, at least one patch is of the GRIN type.

According to a characteristic of the invention, at least one patch is disposed on at least one of the two faces of the lens.

In a particular element, a first patch and a second patch are disposed respectively on the rear face and the front face of the lens, the power of the second patch being equal to the opposite of the power of the first patch.

According to another characteristic of the invention, at least one patch is placed at least in part on at least one of the plane and parallel faces of the optical insert.

In a particular example, a first patch and a second patch are placed at least in part respectively on the face of the optical insert that is directly in the proximity of the rear face of the lens, and on the face of the optical insert that is directly in the proximity of the front face of the lens, the power of the second patch being equal to the opposite of the power of the first patch.

In another variant, at least one of the correction elements comprises an area of machining on at least one of the two faces of the lens.

In a particular element, first and second areas of machining are provided respectively on the rear face and the front face of the lens, the power of said second area of machining being equal to the opposite of the power of said first area of machining.

In a particularly advantageous embodiment, the lenses constituting said light beam generator system are substantially stationary relative to one another.

This type of light beam generator system makes it possible to guarantee great compactness and a system that does not get in the way of the ametropic wearer.

Furthermore, the light beam generator system is simple to fabricate and is less expensive.

BRIEF DESCRIPTION OF THE DRAWINGS

Other characteristics and advantages of the present invention appear in the light of examples below with reference to the annotated drawings, said examples and drawings being given by way of non-limiting illustration.

DETAILED DESCRIPTION

Figure 1:
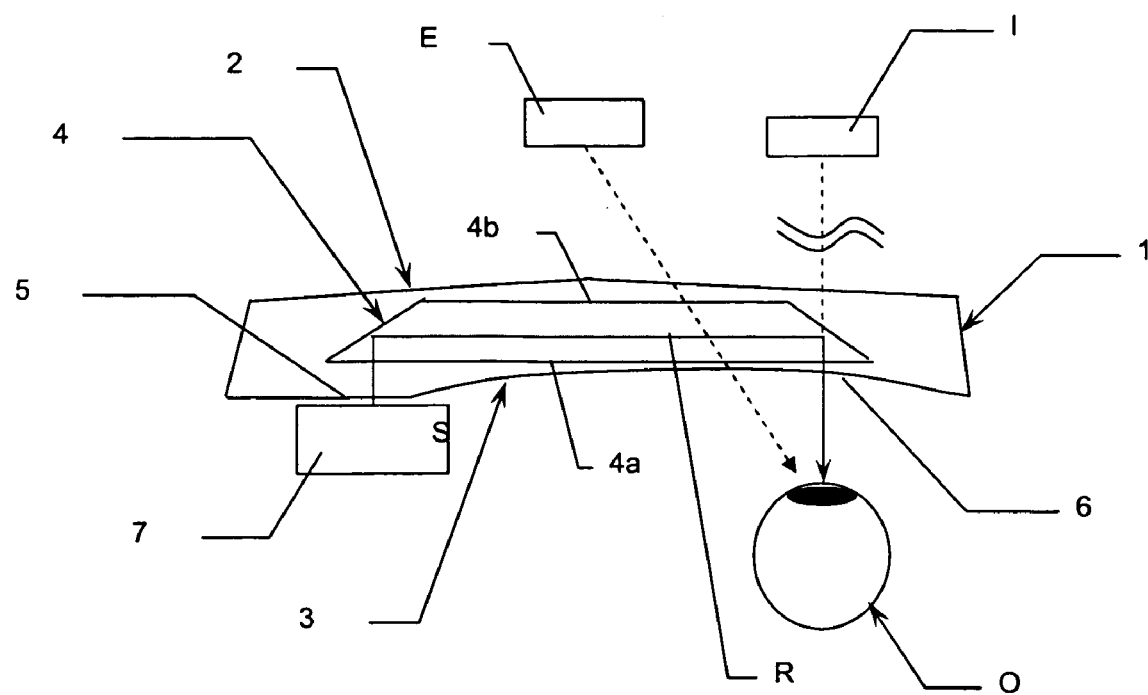
FIG. 1 is a section view of a lens having an optical insert included therein, in accordance with the prior art.

FIG. 1 shows a single-vision eyesight-correcting lens 1 having a front face 2 and a rear face 3, the rear face being situated directly in the proximity of the eye O of an ametropic wearer.

The front and rear faces 2 and 3 are made in a manner well known to the person skilled, e.g. by machining and polishing or else by molding, so as to obtain the eyesight correction desired for the ametropic wearer.

The lens 1 includes an optical insert 4 made of a transparent material, mineral glass or a plastics material, having an index of refraction that is substantially equal to that of the material constituting the lens 1 over the entire visible spectrum.

This serves to eliminate undesirable prismatic effects and to minimize the visibility of the optical insert 4.

In terms of appearance, the presence of the optical insert 4 in the lens is thus invisible or practically invisible.

The optical insert 4 has two plane and parallel faces 4a and 4b, the face 4a being directly in the proximity of the rear face 3 of the lens and the face 4b being directly in the proximity of the front face 2 of the lens.

A light beam generator system 7 delivers light beams, represented by the path of its main ray R, which beams are introduced into the lens 1 via an inlet surface 5 thereof.

This inlet surface 5 and the path of the main ray R are substantially perpendicular.

The optical insert 4 causes the main ray R to be directed towards the eye 0 of the ametropic wearer so as to enable image or multimedia type information I to be viewed.

To do this, the main ray R may be reflected a plurality of times (not shown) between the two faces 4a and 4b of the optical insert 4, referred to as reflection faces, extending between the inlet surface 5 and the outlet zone 6 of the lens, as described in patent document FR-2 873 212 or patent document WO 01/95027.

The beam generator system 7 is a system optionally enabling the information image I to be corrected by adjusting the focusing of the image using said system 7.

It is preferable to use a light beam generator system 7 that is constituted solely by substantially stationary elements, and in particular that does not include any compact focus-adjustment means that enable the viewing distance of the information image I to be adjusted.

With a single-vision lens 1, the power of the lens, more precisely of the ocular glass, corresponds to the correction required to enable the ametropic wearer to view the surroundings E, and is equal to the sum of the power provided by the front face 2 plus the power provided by the rear face 3 of the lens.

The power of the lens 1 is independent of the viewing direction of the wearer, i.e. of the portion of the lens through which the user views the surroundings E.

The exact equations for calculating the power of the lens can be obtained using Gullstrand's equations, which are well known to the person skilled in the art.

The equations below are approximations since they do not take the thickness of the lens into account.

The power provided for viewing the surrounding E is given by the following equation:

$$P(\text{view surrounding } E) = P(\text{front face 2}) + P(\text{rear face 3})$$

with:

$$P(\text{front face 2}) = (n-1)/R_{\text{front face 2}}$$

$$P(\text{rear face 3}) = (n-1)/R_{\text{rear face 3}}$$

where:
  $n$ is the refractive index of the lens;
  $R_{\text{front face 2}}$ is the radius of curvature of the front face 2; and
  $R_{\text{rear face 3}}$ is the radius of curvature of the rear face 3.

The optical path of the information image I does not pass through the front face 2 of the lens 1.

Thus, the optical correction available on the path imaging the information I is equal to the power of the rear face 3 on its own, i.e.:

$$P(\text{view information } I) = P(\text{rear face 3})$$

The imaging path for the information I thus does not correspond to the vision correction described for the ametropic wearer since the information I is viewed without taking account of the power of the front face 2 of the lens.

It is therefore appropriate to compensate for this lack of correction by means of an arrangement of the lens 1 that enables the ametropic wearer of said lens to provide an accommodation effort that is less or equal to 2D when viewing the information content I.

In an embodiment of the invention, the arrangement of the lens is provided on the front face or on the rear face of the lens.

In a first variant corresponding to a short-sighted wearer, the lens has a rear face with a radius of curvature that is less than the radius of curvature of the front face of the lens.

Thus, the power of the rear face is greater, in absolute value, than the power of the front face of the lens.

Selecting a front face of the lens having power lying in the range 0 to +3D enables the short-sighted wearer to view the information path without fatigue, the accommodation effort being less than or equal to 2D.

Tables 1 to 4 corresponding to a lens front face having the following respective powers: +0.25D, +1D, +2D, and +3D show that the lens powers lie within a broad range of values that may be as much as −10D, in order to guarantee that the accommodation effort is less than or equal to 2D.

TABLE 1

Front face power +0.25 D

| Lens power in D | Rear face power in D | Comfortable viewing distance in m | Position of information in m | Calculated accommodation effort EF0 in D |
|---|---|---|---|---|
| −15.00 | −15.25 | 0.06 | 0.08 | 2.77 |
| −10.00 | −10.25 | 0.09 | 0.11 | 1.70 |
| −6.00 | −6.25 | 0.14 | 0.17 | 1.12 |
| −4.00 | −4.25 | 0.20 | 0.25 | 0.92 |
| −3.75 | −4.00 | 0.21 | 0.26 | 0.90 |
| −3.50 | −3.75 | 0.22 | 0.28 | 0.89 |
| −3.25 | −3.50 | 0.24 | 0.30 | 0.87 |
| −3.00 | −3.25 | 0.25 | 0.32 | 0.85 |
| −2.75 | −3.00 | 0.27 | 0.34 | 0.84 |
| −2.50 | −2.75 | 0.29 | 0.37 | 0.82 |
| −2.25 | −2.50 | 0.31 | 0.41 | 0.81 |
| −2.00 | −2.25 | 0.33 | 0.45 | 0.80 |
| −1.75 | −2.00 | 0.36 | 0.51 | 0.79 |
| −1.50 | −1.75 | 0.40 | 0.58 | 0.78 |
| −1.25 | −1.50 | 0.44 | 0.68 | 0.77 |
| −1.00 | −1.25 | 0.50 | 0.81 | 0.77 |
| −0.75 | −1.00 | 0.57 | 1.01 | 0.76 |
| −0.50 | −0.75 | 0.67 | 1.34 | 0.76 |
| −0.25 | −0.50 | 0.80 | 2.01 | 0.75 |
| 0.00 |  | 1.00 |  |  |

TABLE 2

Front face power +1 D

| Lens power in D | Rear face power in D | Comfortable viewing distance in m | Position of information in m | Calculated accommodation effort EF0 in D |
|---|---|---|---|---|
| −15.00 | −16.00 | 0.06 | 0.07 | 2.21 |
| −10.00 | −11.00 | 0.09 | 0.10 | 1.09 |
| −6.00 | −7.00 | 0.14 | 0.15 | 0.46 |
| −4.00 | −5.00 | 0.20 | 0.21 | 0.24 |
| −3.75 | −4.75 | 0.21 | 0.22 | 0.22 |
| −3.50 | −4.50 | 0.22 | 0.23 | 0.19 |
| −3.25 | −4.25 | 0.24 | 0.25 | 0.17 |
| −3.00 | −4.00 | 0.25 | 0.26 | 0.15 |
| −2.75 | −3.75 | 0.27 | 0.28 | 0.14 |
| −2.50 | −3.50 | 0.29 | 0.30 | 0.12 |
| −2.25 | −3.25 | 0.31 | 0.32 | 0.10 |
| −2.00 | −3.00 | 0.33 | 0.34 | 0.09 |
| −1.75 | −2.75 | 0.36 | 0.37 | 0.07 |
| −1.50 | −2.50 | 0.40 | 0.41 | 0.06 |
| −1.25 | −2.25 | 0.44 | 0.45 | 0.05 |
| −1.00 | −2.00 | 0.50 | 0.51 | 0.04 |
| −0.75 | −1.75 | 0.57 | 0.58 | 0.03 |
| −0.50 | −1.50 | 0.67 | 0.68 | 0.02 |
| −0.25 | −1.25 | 0.80 | 0.81 | 0.02 |
| 0.00 |  | 1.00 |  |  |

TABLE 3

Front face power +2 D

| Lens power in D | Rear face power in D | Comfortable viewing distance in m | Position of information in m | Calculated accommodation effort EF0 in D |
|---|---|---|---|---|
| −15.00 | −17.00 | 0.06 | 0.07 | 1.47 |
| −10.00 | −12.00 | 0.09 | 0.09 | 0.29 |
| −8.00 | −10.00 | 0.11 | 0.11 | 0.09 |
| −6.00 | −8.00 | 0.14 | 0.14 | 0.41 |
| −3.75 | −5.75 | 0.21 | 0.18 | 0.69 |
| −3.50 | −5.50 | 0.22 | 0.19 | 0.71 |
| −3.25 | −5.25 | 0.24 | 0.20 | 0.74 |
| −3.00 | −5.00 | 0.25 | 0.21 | 0.76 |
| −2.75 | −4.75 | 0.27 | 0.22 | 0.78 |
| −2.50 | −4.50 | 0.29 | 0.23 | 0.81 |
| −2.25 | −4.25 | 0.31 | 0.25 | 0.83 |
| −2.00 | −4.00 | 0.33 | 0.26 | 0.85 |
| −1.75 | −3.75 | 0.36 | 0.28 | 0.86 |
| −1.50 | −3.50 | 0.40 | 0.30 | 0.88 |
| −1.25 | −3.25 | 0.44 | 0.32 | 0.90 |
| −1.00 | −3.00 | 0.50 | 0.34 | 0.91 |
| −0.75 | −2.75 | 0.57 | 0.37 | 0.93 |
| −0.50 | −2.50 | 0.67 | 0.41 | 0.94 |
| −0.25 | −2.25 | 0.80 | 0.45 | 0.95 |
| 0.00 |  | 1.00 |  |  |

TABLE 4

Front face power +3 D

| Lens power in D | Rear face power in D | Comfortable viewing distance in m | Position of information in m | Calculated accommodation effort EF0 in D |
|---|---|---|---|---|
| −15 | −18.00 | 0.06 | 0.07 | 0.75 |
| −10 | −13.00 | 0.09 | 0.09 | 0.5 |
| −8 | −11.00 | 0.11 | 0.1 | 0.91 |
| −6 | −9.00 | 0.14 | 0.12 | 1.26 |
| −3.75 | −6.75 | 0.21 | 0.16 | 1.57 |
| −3.5 | −6.50 | 0.22 | 0.16 | 1.6 |
| −3.25 | −6.25 | 0.24 | 0.17 | 1.63 |
| −3 | −6.00 | 0.25 | 0.18 | 1.66 |
| −2.75 | −5.75 | 0.27 | 0.18 | 1.69 |
| −2.5 | −5.50 | 0.29 | 0.19 | 1.71 |
| −2.25 | −5.25 | 0.31 | 0.2 | 1.74 |
| −2 | −5.00 | 0.33 | 0.21 | 1.76 |
| −1.75 | −4.75 | 0.36 | 0.22 | 1.78 |
| −1.5 | −4.50 | 0.4 | 0.23 | 1.81 |
| −1.25 | −4.25 | 0.44 | 0.25 | 1.83 |
| −1 | −4.00 | 0.5 | 0.26 | 1.85 |
| −0.75 | −3.75 | 0.57 | 0.28 | 1.86 |
| −0.5 | −3.50 | 0.67 | 0.3 | 1.88 |
| −0.25 | −3.25 | 0.8 | 0.32 | 1.9 |
| 0 | | 1 | | |

In the present invention, the accommodation effort EF0 in absolute value is calculated using the following equation:

$$\frac{1}{\text{comfortable viewing distance}} - \frac{1}{\text{position of information image}}$$

The comfortable viewing distance is the viewing distance without providing any accommodation effort. For a person who is ametropic, this distance is equal to 1 meter (m).

The position of the information image is the position of the information image I in the viewing space of the wearer, after the information image I has passed through the rear face of the lens.

The information image I is thus viewed very comfortably by a short-sighted wearer.

In particularly advantageous manner, arranging a front face of power +1D makes it possible, surprisingly, to obtain an accommodation effort that is much less than when using front faces of power +3D, +2D, or +0.25D, the powers of the lens lying within a wide range of values that may be as much as −10D, as shown in Table 2.

In contrast, when the power of the front face of the lens is greater than +3D, the calculated accommodation effort EF0 is not acceptable over a wider range of lens powers.

For example, as shown in Table 5, a lens having a front face power equal to +4D does not enable said lens to be used with power lying in the range −6D to −0.25D, since the calculated accommodation effort EF0 is greater than 2D.

TABLE 5

Front face power +4 D

| Lens power in D | Rear face power in D | Comfortable viewing distance in m | Position of information in m | Calculated accommodation effort EF0 in D |
|---|---|---|---|---|
| −15.00 | −19.00 | 0.06 | 0.06 | 0.03 |
| −10.00 | −14.00 | 0.09 | 0.08 | 1.28 |

TABLE 5-continued

Front face power +4 D

| Lens power in D | Rear face power in D | Comfortable viewing distance in m | Position of information in m | Calculated accommodation effort EF0 in D |
|---|---|---|---|---|
| −8.00 | −12.00 | 0.11 | 0.09 | 1.71 |
| −6.00 | −10.00 | 0.14 | 0.11 | 2.09 |
| −3.75 | −7.75 | 0.21 | 0.14 | 2.44 |
| −3.50 | −7.50 | 0.22 | 0.14 | 2.48 |
| −3.25 | −7.25 | 0.24 | 0.15 | 2.51 |
| −3.00 | −7.00 | 0.25 | 0.15 | 2.54 |
| −2.75 | −6.75 | 0.27 | 0.16 | 2.57 |
| −2.50 | −6.50 | 0.29 | 0.16 | 2.60 |
| −2.25 | −6.25 | 0.31 | 0.17 | 2.63 |
| −2.00 | −6.00 | 0.33 | 0.18 | 2.66 |
| −1.75 | −5.75 | 0.36 | 0.18 | 2.69 |
| −1.50 | −5.50 | 0.40 | 0.19 | 2.71 |
| −1.25 | −5.25 | 0.44 | 0.20 | 2.74 |
| −1.00 | −5.00 | 0.50 | 0.21 | 2.76 |
| −0.75 | −4.75 | 0.57 | 0.22 | 2.78 |
| −0.50 | −4.50 | 0.67 | 0.23 | 2.81 |
| −0.25 | −4.25 | 0.80 | 0.25 | 2.83 |
| 0.00 | | 1.00 | | |

In a second variant, the same principle can be applied for a wearer who is long-sighted.

Under such circumstances, the lens has a front face with a radius of curvature that is less than the radius of curvature of the rear face of the lens.

Thus, the power of the front face is greater, in absolute value, than the power of the rear face of the lens.

Selecting a lens rear face with power lying in the range 0 to +1.25D enables the short-sighted wearer to view the information path I without fatigue, the accommodation effort being less than or equal to 2D.

Table 6 shows that for a calculated accommodation effort EF0 that is less than or equal to 2D, it is possible to obtain comfortable viewing for a lens of power up to a maximum of +2D by using a rear face of power −1D.

TABLE 6

Rear face power −1 D

| Lens power in D | Front face power in D | Comfortable viewing distance in m | Position of information in m | Calculated accommodation effort EF0 in D |
|---|---|---|---|---|
| 4.00 | 5.00 | −0.33 | 1.02 | 3.98 |
| 3.75 | 4.75 | −0.36 | 1.02 | 3.73 |
| 3.50 | 4.50 | −0.40 | 1.02 | 3.48 |
| 3.25 | 4.25 | −0.44 | 1.02 | 3.23 |
| 3.00 | 4.00 | −0.50 | 1.02 | 2.98 |
| 2.75 | 3.75 | −0.57 | 1.02 | 2.73 |
| 2.50 | 3.50 | −0.67 | 1.02 | 2.48 |
| 2.25 | 3.25 | −0.80 | 1.02 | 2.23 |
| 2.00 | 3.00 | −1.00 | 1.02 | 1.98 |
| 1.75 | 2.75 | −1.33 | 1.02 | 1.73 |
| 1.50 | 2.50 | −2.00 | 1.02 | 1.48 |
| 1.25 | 2.25 | −4.00 | 1.02 | 1.23 |
| 1.00 | 2.00 | infinity | 1.02 | 0.98 |
| 0.75 | 1.75 | 4.00 | 1.02 | 0.73 |
| 0.50 | 1.50 | 2.00 | 1.02 | 0.48 |
| 0.25 | 1.25 | 1.33 | 1.02 | 0.23 |
| 0.00 | | 1.00 | | |

Table 7 shows that for a calculated accommodation effort EF0 that is less than or equal to 2D, it is possible to obtain comfortable viewing for a lens power up to a maximum of +2.75D, by using a rear face of power −0.25D.

TABLE 7

| | | Rear face power −0.25 D | | |
|---|---|---|---|---|
| Lens power in D | Front face power in D | Comfortable viewing distance in m | Position of information in m | Calculated accommodation effort EF0 in D |
| 4.00 | 4.25 | −0.33 | 4.03 | 3.25 |
| 3.75 | 4.00 | −0.36 | 4.03 | 3.00 |
| 3.50 | 3.75 | −0.40 | 4.03 | 2.75 |
| 3.25 | 3.50 | −0.44 | 4.03 | 2.50 |
| 3.00 | 3.25 | −0.50 | 4.03 | 2.25 |
| 2.75 | 3.00 | −0.57 | 4.03 | 2.00 |
| 2.50 | 2.75 | −0.67 | 4.03 | 1.75 |
| 2.25 | 2.50 | −0.80 | 4.03 | 1.50 |
| 2.00 | 2.25 | −1.00 | 4.03 | 1.25 |
| 1.75 | 2.00 | −1.33 | 4.03 | 1.00 |
| 1.50 | 1.75 | −2.00 | 4.03 | 0.75 |
| 1.25 | 1.50 | −4.00 | 4.03 | 0.50 |
| 1.00 | 1.25 | infinity | 4.03 | 0.25 |
| 0.75 | 1.00 | 4.00 | 4.03 | 0.00 |
| 0.50 | 0.75 | 2.00 | 4.03 | −0.25 |
| 0.25 | 0.50 | 1.33 | 4.03 | −0.50 |
| 0.00 | | 1.00 | | |

Tables 8 and 9 show an optimized range of lenses in accordance with the invention that cover respectively optical power in the range −4D to −0.5D for a short-sighted wearer and in the range 0.5D to 3D for a long-sighted wearer.

TABLE 8

| | Short-sighted wearer Front face power +1 D | | |
|---|---|---|---|
| Lens power in D | Front face radius in mm | Rear face radius in mm | Center thickness of lens in mm |
| −0.5 | 597.43 | 397.8 | 3.43 |
| −1 | 597.43 | 298.49 | 3.43 |
| −1.5 | 597.43 | 238.86 | 3.43 |
| −2 | 597.43 | 199.09 | 3.43 |
| −2.5 | 597.43 | 170.67 | 3.43 |
| −3 | 597.43 | 149.35 | 3.43 |
| −3.5 | 597.43 | 132.77 | 3.43 |
| −4 | 597.43 | 119.5 | 3.43 |

TABLE 9

| | Long-sighted wearer Rear face power −0.25 D | | |
|---|---|---|---|
| Lens power in D | Rear face radius in mm | Front face radius in mm | Center thickness of lens in mm |
| 0.5 | 2389.73 | 798.48 | 3.27 |
| 1 | 2389.73 | 479.29 | 3.59 |
| 1.5 | 2389.73 | 342.42 | 3.91 |
| 2 | 2389.73 | 266.36 | 4.22 |
| 2.5 | 2389.73 | 217.96 | 4.54 |
| 3 | 2389.73 | 184.44 | 4.86 |

The material used for the lens is the monomer MR6, of index 1.59911 at a wavelength of 550 nanometers (nm)

The optical insert is of the same type as the optical insert described in patent WO 01/95027, and it presents thickness of 2 millimeters (mm).

The results of Tables 8 and 9 take the real thickness of the lens into account.

In another embodiment in accordance with the invention, the lens includes at least one correction element situated between the optical insert 4 and the wearer's eye O.

Figure 2:
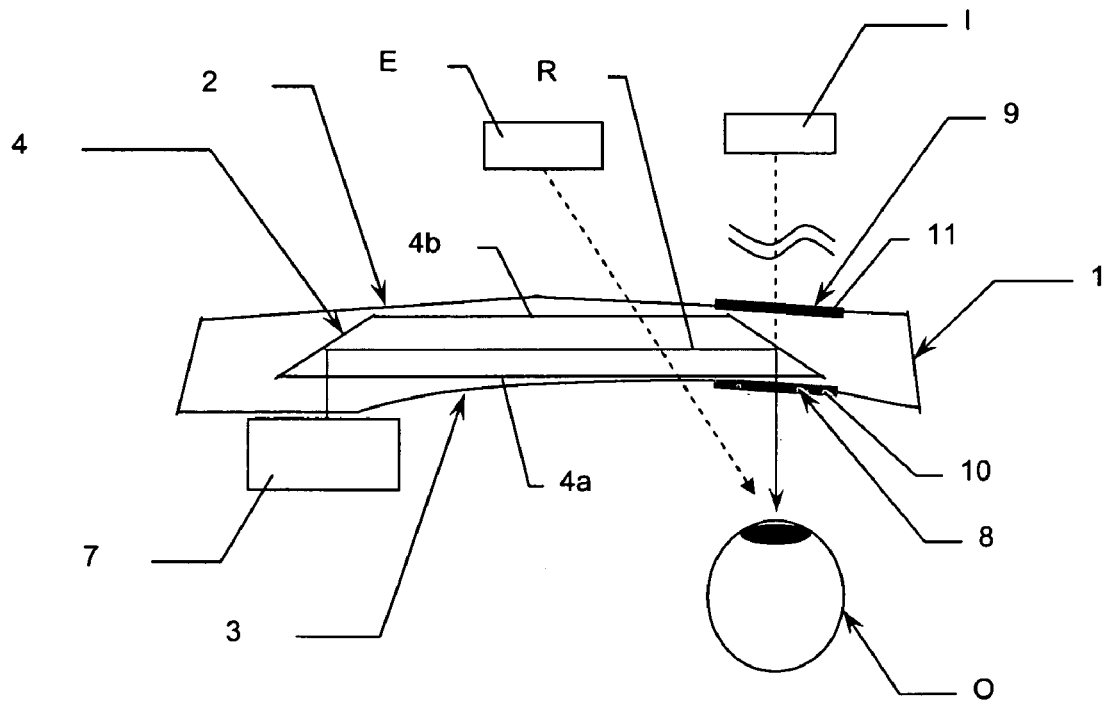
FIG. 2 is a section view of a lens in which an optical insert is included, the lens being arranged in accordance with an embodiment variant of the invention.
Figure 3:
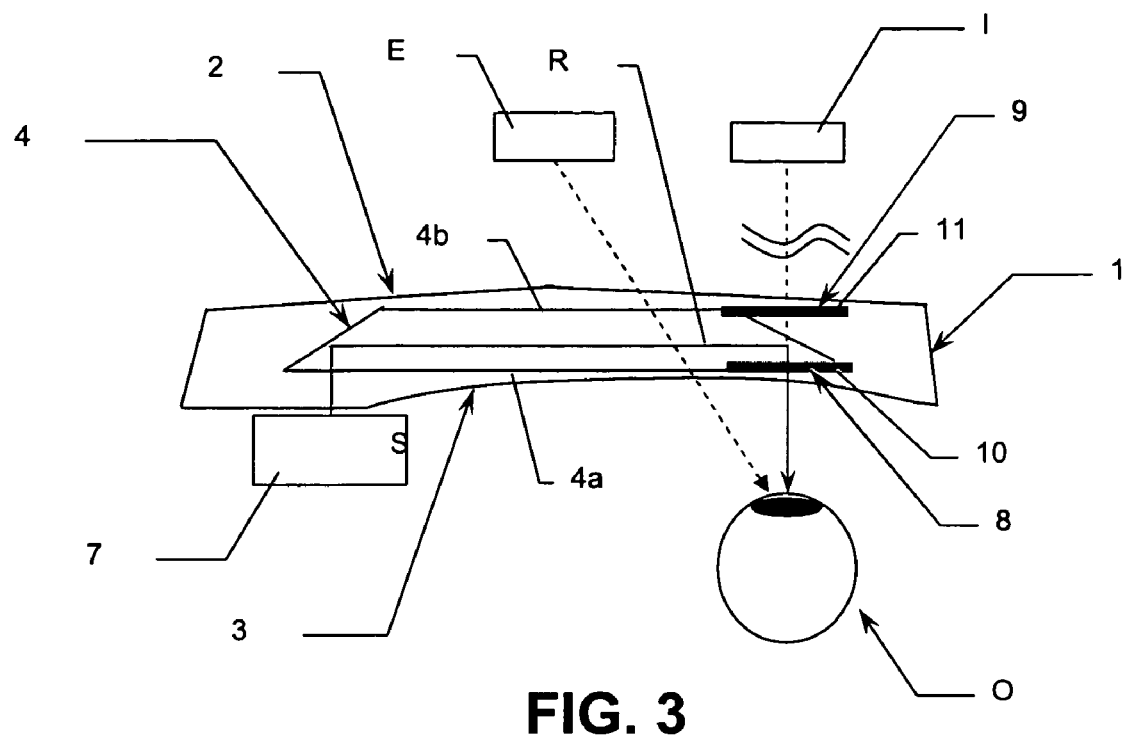
FIG. 3 is a section view of a lens in which an optical insert is included, the lens being arranged in accordance with another embodiment variant of the invention.
Figure 4:
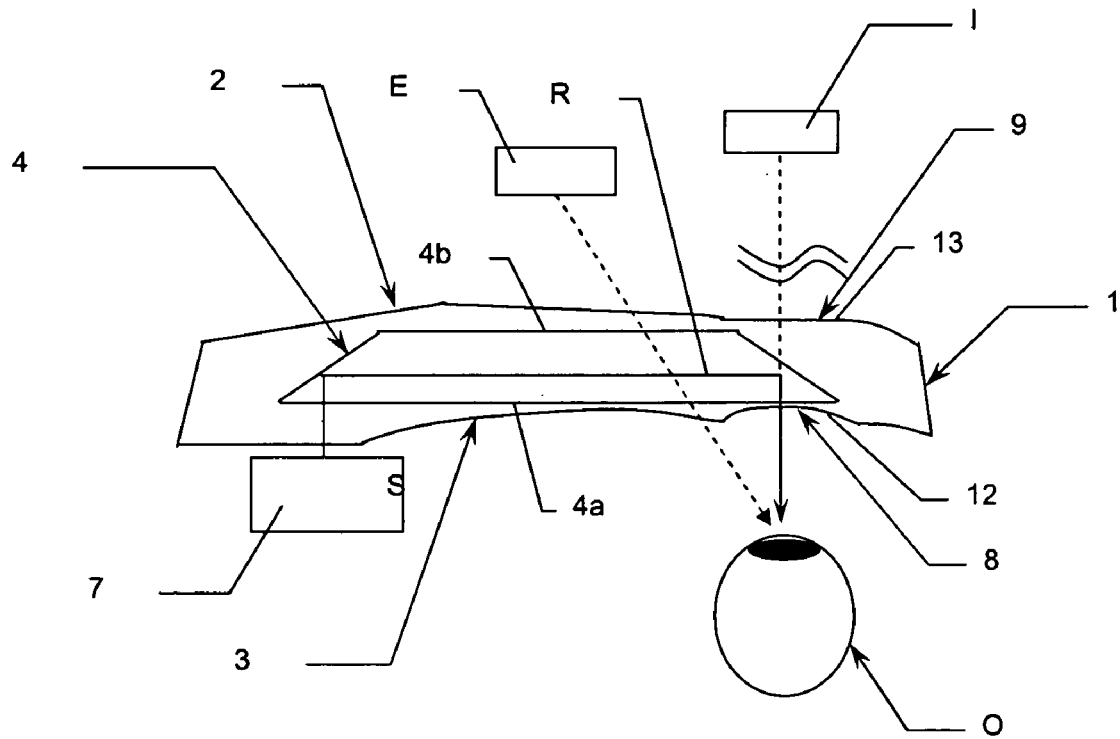
FIG. 4 is a section view of a lens in which an optical insert is included, the lens being arranged in accordance with another embodiment variant of the invention.

Preferably, the lens 1 includes a first correction element 8 situated between the optical insert 4 and the wearer's eye O, and a second correction element 9 situated between the optical insert 4 and the information content I, as shown in FIGS. 2 to 4, the power of said second correction element being equal to the opposite of the power of said first correction element.

The first correction element 8 and the second correction element 9 are made in the working diameter that corresponds to the angular field of view of a short-sighted wearer viewing the information I.

In other words, the working diameter is the zone in the rear face of the lens through which the light beams pass.

For example, a working diameter of 17 mm corresponds to an optical insert delivering its image over an angular field of 23°.

These correction elements 8, 9 enable the imaging path of the information I to correspond to the visual correction prescribed for the short-sighted wearer, so that the accommodation effort to be provided by the ametropic wearer is less than or equal to 2D.

Exact equations for calculating the power for viewing the information I can be obtained using Gullstrand's equations, which are well known to the person skilled in the art.

The equations below are approximations since they do not take the thickness of the lens into account.

The optical correction available on the image path of the information I is then equal to the power of the rear face 3 plus the power of the first correction element 8, i.e.:

$P(\text{view information } I) = P(\text{rear face 3}) + P(\text{first correction element 8})$ To ensure that the visual correction of the ametropic wearer is not modified, it is essential to position the second correction element 9 between the optical insert 4 and the information content I.

As a result, the power of the lens 1 corresponding to the correction for the ametropic wearer is as follows:

$P(\text{view surrounding } E) = P(\text{front face 2}) + P(\text{rear face 3}) + P(\text{first correction element 8}) - P(\text{second correction element 9})$ In absolute value, the powers of the first and second correction elements 8 and 9 are identical.

In other words:

$|P(\text{first correction element 8})| = |-P(\text{second correction element 9})|$ This produces:

$P(\text{view surrounding } E) = P(\text{front face 2}) + P(\text{rear face 3})$ The ametropic wearer thus benefits from exceptional visual comfort both when viewing the surrounding E and when viewing the information content I.

In a variant, the correction elements are correction patches.

More particularly, these patches are correcting lenses in the form of small disks of very small thickness, of the order of a few tenths of a millimeter.

Said patches may be of the diffractive type or of the GRIN type. A GRIN type patch is a bar type lens having a graded index that provides the advantage of being a component that is simple, without chromatic aberration, that maintains polarization, and that provides greater flexibility in design since the thickness of such a lens is constant. A patch of the diffractive type, known as a Fresnel patch, is substantially equivalent to a multitude of conventional refractive lenses. The refractive index of diffractive patches is identical throughout the lens, but the thickness of the lens is not constant.

In a particular example, as shown in FIG. 2, a first patch 10 is stuck on the rear face 3 of the lens and a second patch 11 is stuck on the front face 2 of the lens.

In another particular element, as shown in FIG. 3, a first patch 10 is stuck on the face 4a of the optical insert, the face 4a being directly in the proximity of the rear face 3 of the lens, and a second patch 11 is stuck in part on the face 4b of the optical insert 4, the face 4b being directly in the proximity of the front face 2 of the lens.

The first and second patches 10 and 11 are positioned in such a manner that their working diameters enable the field of view of the image generated by the information path I to be covered.

In another variant, and as shown in FIG. 4, the correction elements 8 and 9 comprise a first machined area 12 of the rear face 3 and a second machined area 13 of the front face 2 of the lens.

The first machined area 12 thus guarantees the ametropic wearer can view the information path I comfortably.

The second machined area 13 thus guarantees the ametropic wearer can view the surrounding E comfortably.

The front and rear faces 2 and 3 of the lens are thus locally modified so as to guarantee comfortable viewing for the ametropic wearer both of the information image I and of the surrounding E.

For this purpose, the first machined area 12 and the second machined area 13 are provided in the working diameter corresponding to the angular field of view occupied by the information I for the ametropic wearer.

Thus, in order to obtain a complete range of correction, the present invention proposes using correction elements 8, 9, 10, 11, 12, and 13 in order to view the information content I without fatigue.

When the calculated accommodation effort EF0 is greater than 2D, the following formula applies:

$$|\text{calculated accommodation effort } EF0| \geq P(\text{first correction element } 8, 10, 12) \geq |\text{calculated accommodation effort } EF0| - 2D$$

and $$P(\text{second correction element } 9, 11, 13) = -P(\text{first correction element } 8, 10, 12)$$

In other words:
P(first correction element 8, 10, 12)=|calculated accommodation effort EF0|, to obtain zero accommodation effort;

P(first correction element 8, 10, 12)=|calculated accommodation effort EF0|−2D, to obtain an accommodation effort equal to 2D; and

|calculated accommodation effort EF0|>P(first correction element 8, 10, 12)>|calculated accommodation effort EF0|−2D, to obtain an accommodation effort greater than 0 and less than 2D.

When the calculated accommodation effort EF0 is less than or equal to 2D, the first and second correction elements are unnecessary, but they enable the information path I to be optimized so as to provide the ametropic wearer with additional viewing comfort.

When the calculated accommodation effort EF0 is less than or equal to 2D, the following equation applies:

$$|\text{calculated accommodation effort } EF0| \geq P(\text{first correction element } 8, 10, 12) \geq 0$$

and $$P(\text{second correction element } 9, 11, 13) = -P(\text{first correction element } 8, 10, 12)$$

In other words:
P(first correction element 8, 10, 12)=|calculated accommodation effort EF0|, in order to obtain zero accommodation effort; and calculated accommodation effort EF0|>P(first correction element 8, 10, 12)≧0, in order to obtain an accommodation effort greater than 0 and less than or equal to 2D.

Considering the results of Table 7 for long-sighted wearers with a front face of power −0.25D, it can be seen that it is possible to obtain comfortable viewing, i.e. with a calculated accommodation effort EF0 that is less than or equal to 2D, for a lens of power up to a maximum of +2.75D.

To be able to use a lens of power +4D, in accordance with the invention, and considering that:
the first correction element 8 is a first patch 10; and
the second correction element 9 is a second patch then said first patch 10 needs to have power of +1.25D to obtain an accommodation effort equal to 2D. The second patch 11 therefore needs to have power of −1.25D.

If it is desirable to obtain zero accommodation effort, a first patch 10 of power +3.25D is required, so the second patch 11 needs a power of −3.25D.

In another variant of the invention, the correction element situated between the optical insert and the eye of the ametropic wearer may comprise an element that increases the depth of field of said wearer.

This element that increases the depth of field may thus be combined, for example, with first and second patches and/or first and second machined areas, as described herein and shown in FIGS. 2 to 4.

Figure 5:
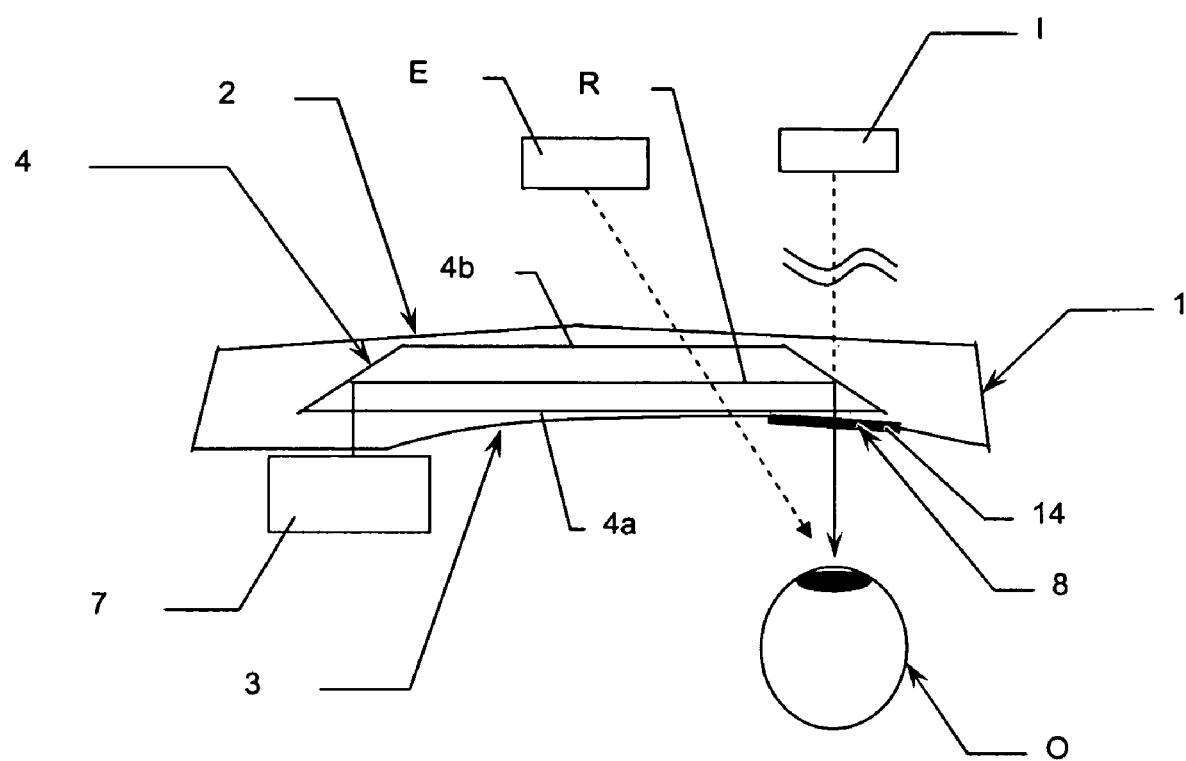
FIG. 5 is a section view of a lens in which an optical insert is included, the lens being arranged in accordance with another embodiment variant of the invention.

In a particularly advantageous example and as shown in FIG. 5, the correction element 8 situated between the optical insert 4 and the eye O of an ametropic wearer is said element 14 that increases the depth of field of said wearer, the lens 1 not having any other correction element situated between the optical insert 4 and the information content I.

As shown in FIG. 5, this element 14 increasing the depth of field may be placed on the rear face 3 of the lens, or it may be placed (not shown) at least in part on the face 4a of the optical insert 4 directly in the proximity of the rear face 3 of the lens.

The lens 1 as arranged in this way enables the ametropic wearer to provide an accommodation effort that is less than or equal to 2D while viewing the information content I, and ophthalmic viewing is also comfortable.

The present invention is not limited to the embodiments described above and it covers generally all lenses that can be envisaged from the general indications provided in the description of the invention.

Specifically, the first and/or second correction element may be any feasible combination of a patch and/or machining, and more particularly it may be a combination of at least one patch together with machining, or it may be a plurality of patches.

Furthermore, the treatments that are optionally performed on an ophthalmic lens, for example treatment against reflections, against dirtying, or solar type tinting using pigments, can all be provided with disturbing the information path function.

The invention claimed is:

1. An eyesight correcting lens comprising:
   a front face and a rear face, and into which light beams emitted by a light beam generator system are introduced via an inlet surface and directed towards the eye of an ametropic wearer of said lens to enable information content to be viewed; and
   an optical insert being included in the lens, wherein the lens is arranged so as to enable the wearer of said lens to provide an accommodation effort that is less than or equal to 2D when viewing the information content.

2. A lens according to claim 1, for a short-sighted wearer, wherein the lens is arranged in such a manner that the power of the front face (2) of the lens lies in the range 0D to +3D, the additional power needed for the lens for correcting the vision of said wearer being provided by the rear face (3) of the lens.

3. A lens according to claim 2, wherein the power of the front face of the lens is equal to +1D.

4. A lens according to claim 1, for a long-sighted wearer, wherein the lens is arranged in such a manner that the power of the rear face of the lens lies in the range −1.25D to 0 D, the additional power needed by the lens for correcting the vision of said wearer being provided by the front face of the lens.

5. A lens according to claim 4, wherein the power of the rear face of the lens is equal to −0.25D.

6. A lens according to claim 1, wherein the lens includes at least one correction element situated between the optical insert and the eye of the wearer.

7. A lens according to claim 6, wherein the correction element further comprises an element that increases the depth of field.

8. A lens according to claim 6, wherein the lens further comprises:
   a first correction element situated between the optical insert and the eye of the wearer; and
   a second correction element situated between the optical insert and the information content, the power of said second correction element being equal to the opposite of the power of said first correction element.

9. A lens according to claim 8, wherein at least one of its correction elements further comprises a patch.

10. A lens according to claim 9, wherein at least one patch is of the diffractive type.

11. A lens according to claim 9 wherein at least one patch is of the GRIN type.

12. A lens according to claim 9, wherein at least one patch is disposed on at least one of the two faces of the lens.

13. A lens according to claim 9, wherein a first patch and a second patch are disposed respectively on the rear face and the front face of the lens, the power of the second patch being equal to the opposite of the power of the first patch.

14. A lens according to claim 9, wherein at least one patch is placed at least in part on at least one of the plane and parallel faces of the optical insert.

15. A lens according to claim 9, wherein a first patch and a second patch are placed at least in part respectively on the face of the optical insert that is directly in the proximity of the rear face of the lens, and on the face of the optical insert that is directly in the proximity of the front face of the lens, the power of the second patch being equal to the opposite of the power of the first patch.

16. A lens according to claim 8, wherein at least one of the correction elements further comprises an area of machining on at least one of the two faces of the lens.

17. A lens according to claim 16, wherein first and second areas of machining are provided respectively on the rear face and the front face of the lens, the power of said second area of machining being equal to the opposite of the power of said first area of machining.

18. A lens according to claim 1, wherein the lenses constituting said light beam generator system are substantially stationary relative to one another.

* * * * *